US010598030B2

(12) United States Patent
Kottilingam et al.

(10) Patent No.: US 10,598,030 B2
(45) Date of Patent: Mar. 24, 2020

(54) ASSEMBLY, TREATED ARTICLE, AND PROCESS OF TREATING A TURBINE COMPONENT

(71) Applicant: GENERAL ELECTRIC COMPANY, Schenectady, NY (US)

(72) Inventors: Srikanth Chandrudu Kottilingam, Simpsonville, SC (US); Yan Cui, Greer, SC (US); Brian Lee Tollison, Honea Path, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 640 days.

(21) Appl. No.: 15/402,725

(22) Filed: Jan. 10, 2017

(65) Prior Publication Data

US 2018/0195398 A1    Jul. 12, 2018

(51) Int. Cl.
| | | |
|---|---|---|
| *F01D 5/22* | (2006.01) | |
| *B23K 1/00* | (2006.01) | |
| *B23K 35/02* | (2006.01) | |
| *C22C 19/07* | (2006.01) | |
| *B23K 35/30* | (2006.01) | |

(Continued)

(52) U.S. Cl.
CPC ............ *F01D 5/225* (2013.01); *B23K 1/0018* (2013.01); *B23K 20/021* (2013.01); *B23K 35/0233* (2013.01); *B23K 35/0244* (2013.01); *B23K 35/3046* (2013.01); *B23P 6/005* (2013.01); *C21D 1/785* (2013.01); *C21D 9/0068* (2013.01); *C22C 19/07* (2013.01); *C22F 1/10* (2013.01); *F01D 5/005* (2013.01); *B23K 2101/001* (2018.08); *F01D 5/28* (2013.01); *F05D 2230/22* (2013.01); *F05D 2230/237* (2013.01);

(Continued)

(58) Field of Classification Search
CPC ............ B23K 1/0018; B23K 2101/001; F05D 2230/80; F01D 5/005
See application file for complete search history.

(56) References Cited

U.S. PATENT DOCUMENTS

| | | | | |
|---|---|---|---|---|
| 4,940,566 A | * | 7/1990 | Wood .................. | B23K 35/3033 228/262.31 |
| 6,164,916 A | * | 12/2000 | Frost .................. | B23K 35/3046 148/528 |

(Continued)

*Primary Examiner* — Phutthiwat Wongwian
*Assistant Examiner* — Arnold Castro
(74) *Attorney, Agent, or Firm* — McNees Wallace & Nurick LLC

(57) ABSTRACT

In some embodiments, a process treats a turbine component. The turbine component includes an article and a wear component brazed to the article. The process includes applying a braze tape on at least a portion of the wear component and thermal processing the turbine component while the braze tape is on the at least a portion of the wear component to treat the turbine component. In some embodiments, an assembly includes a turbine component. The turbine component includes an article and a pre-sintered preform brazed to a surface of the article. The assembly also includes a braze tape on at least a portion of the pre-sintered preform. In some embodiments, a treated turbine component includes a treated article and a pre-sintered preform brazed to a surface of the treated article. The treated turbine component has been thermally processed with the pre-sintered preform being substantially free of re-flow.

19 Claims, 5 Drawing Sheets

(51) Int. Cl.
*C21D 1/78* (2006.01)
*C21D 9/00* (2006.01)
*C22F 1/10* (2006.01)
*B23P 6/00* (2006.01)
*F01D 5/00* (2006.01)
*B23K 20/02* (2006.01)
*F01D 5/28* (2006.01)
*B23K 101/00* (2006.01)

(52) U.S. Cl.
CPC ...... *F05D 2230/80* (2013.01); *F05D 2300/17* (2013.01); *F05D 2300/175* (2013.01)

(56) References Cited

U.S. PATENT DOCUMENTS

| | | | | |
|---|---|---|---|---|
| 2004/0124231 A1* | 7/2004 | Hasz | ............... | B23K 35/3046 228/245 |
| 2009/0123268 A1* | 5/2009 | Brittingham | ............ | F01D 5/141 415/115 |
| 2012/0231295 A1* | 9/2012 | Kottilingam | ......... | B23K 1/0056 428/680 |
| 2014/0154082 A1* | 6/2014 | Shinn | ................... | B23K 1/0018 416/191 |
| 2014/0220376 A1* | 8/2014 | Schick | ................... | B32B 15/01 428/615 |
| 2014/0342169 A1* | 11/2014 | Daniels | .................... | F01D 5/22 428/457 |
| 2015/0377037 A1* | 12/2015 | Salm | ................... | B23K 1/0018 416/241 R |
| 2016/0146020 A1* | 5/2016 | Richter | ................ | C22C 19/058 416/229 A |
| 2016/0245099 A1* | 8/2016 | Dawson | ................ | C23C 24/08 |
| 2017/0252870 A1* | 9/2017 | Cui | ....................... | F01D 5/187 428/457 |
| 2017/0259385 A1* | 9/2017 | Baer | ................... | B23K 35/0244 |

* cited by examiner

ASSEMBLY, TREATED ARTICLE, AND PROCESS OF TREATING A TURBINE COMPONENT

FIELD OF THE INVENTION

The present embodiments are directed to processes of reconditioning turbine components and reconditioned turbine components. More specifically, the present embodiments are directed to processes of reconditioning a turbine component including a pre-sintered preform without removing the pre-sintered preform and such reconditioned turbine components.

BACKGROUND OF THE INVENTION

Some turbine hot gas path components may include one or more sheets of material applied over a portion or portions of the underlying component. For example, during pre-sintered preform (PSP) fabrication, one or more sheets of material are brazed onto a turbine component, such as a shrouded blade, a nozzle, or a bucket. The sheets are usually overlaid then brazed onto the component to form an external surface or skin. Typically, the sheets are substantially flat or include a curvature that is generally similar to the overall shape of the component surface to which they become attached, although, through pressure, bending, and the like, these flat sheets may be conformed to the underlying component surface during the attachment process.

Certain gas turbine components have shrouds at the outer extremity of the airfoil. The blade shrouds are typically designed with an interlocking feature, usually in the form of a z-notch, which allows each component to be interlocked at its shroud with an adjacent neighbor component when such components are installed about the circumference of a turbine disk. This interlocking feature assists in preventing the airfoils from vibrating, thereby reducing the stresses imparted on the components during operation.

Turbine hot gas path components are typically made of nickel-based superalloys or other high temperature superalloys designed to retain high strength at high temperature, and the shroud material of the turbine component and the interlocking z-notch may not be of a sufficient hardness to withstand the wear stresses and rubbing that occur during start-up and shut down of a turbine engine. To improve the wear at these locations, a hardface chiclet PSP may be brazed or welded to the z-notch to serve as a wear surface. The hardface material bonded to the respective z-notches protects each notch within each shroud from wear arising from frictional contact during operation when the turbine components are under centrifugal, pressure, thermal, and vibratory loading.

Conventional reconditioning after service of a turbine component including a hardface chiclet PSP includes machining off the PSP, hot isostatic pressing (HIP) the turbine component, performing a rejuvenation heat treatment of the turbine component, re-brazing the turbine component with the hardface chiclet PSP or a new PSP, and re-machining the z-notch of the turbine component before returning the turbine component to service.

Machining off the PSP hardface chiclet prevents the reconditioning conditions from causing the hardface chiclet PSP to re-melt and re-flow, but a re-brazing is then required to reattach or replace the PSP prior to returning the turbine component to service. The additional steps of machining prior to the thermal processing steps and re-brazing after these thermal processing steps add time and both labor and material cost to the reconditioning process.

BRIEF DESCRIPTION OF THE INVENTION

In an embodiment, a reconditioning process treats a turbine component. The turbine component includes an article and a wear component brazed to the article. The reconditioning process includes applying a braze tape on at least a portion of the wear component and thermal processing the turbine component while the braze tape is on the at least a portion of the wear component to treat the turbine component.

In another embodiment, an assembly includes a turbine component. The turbine component includes an article and a pre-sintered preform brazed to a surface of the article. The assembly also includes a braze tape on at least a portion of the pre-sintered preform.

In another embodiment, a treated turbine component includes a treated article and a pre-sintered preform brazed to a surface of the treated article. The treated turbine component has been thermally processed with the pre-sintered preform being substantially free of re-flow.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
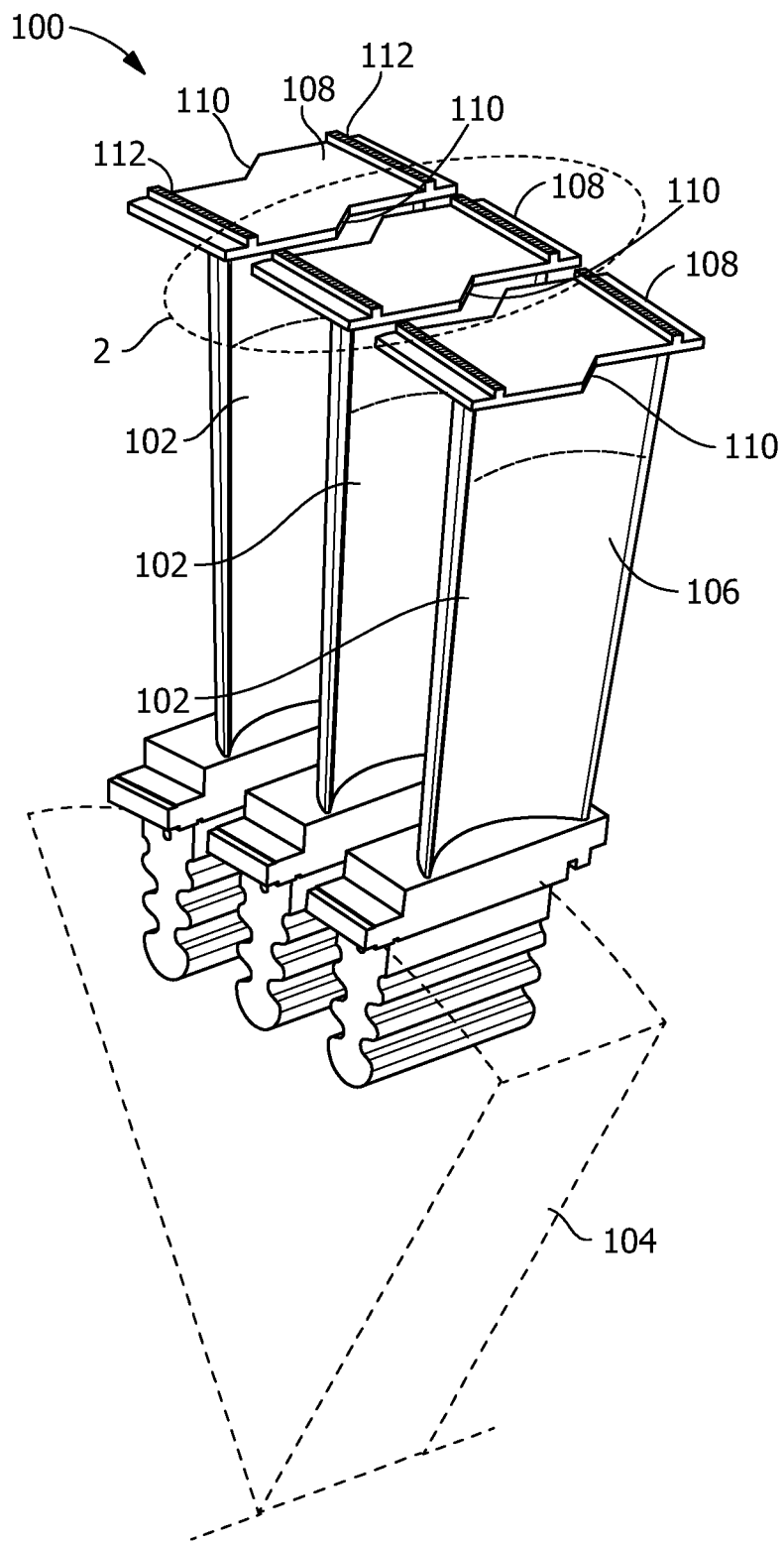
FIG. 1 is a perspective view of a portion of a turbine.

Provided are processes of treating a turbine component including a wear component brazed to an article, assemblies including a turbine component and a braze tape, and treated turbine components including a pre-sintered preform brazed to a surface of a treated article.

Embodiments of the present disclosure, for example, in comparison to concepts failing to include one or more of the features disclosed herein, avoid machining off a pre-sintered preform prior to a thermal processing, avoid placement of a new pre-sintered preform after a thermal processing, avoid brazing after a thermal processing, reduce time and cost for reconditioning a turbine component with a pre-sintered preform having a hardface chiclet, or a combination thereof.

As used herein, "pre-sintered preform" or "PSP" refers to a component or a composition formed from a blend of a superalloy and a braze powder.

As used herein, "chiclet" refers to a piece of PSP that is machined to a predetermined shape and is then brazed onto a component. In some embodiments, the predetermined shape is a substantially rectangular shape. In some embodiments, the substantially rectangular shape has a length and a width that are similar and a height that is less, preferably significantly less, than the length and the width.

As used herein, "hot isostatic pressing" or "HIP" refers to a process to reduce the porosity of a metal and improve the mechanical properties by subjecting the metal to an elevated temperature and an elevated substantially constant pressure in a high pressure vessel with an inert gas atmosphere.

As used herein, "LE 90/10" refers to a flexible braze tape including an alloy composition of about 90% by weight T800 and about 10% by weight MM509B.

As used herein, "TE 95/5" refers to a flexible braze tape including an alloy composition of about 95% by weight T800 and about 5% by weight MM509B.

As used herein, "T800", also known as "TRIBALOY® T-800", refers to an alloy including a composition, by weight, of about 16.5 to about 18.5% chromium (Cr), up to about 1.5% nickel (Ni), about 27 to about 30% molybdenum (Mo), about 3.0 to about 3.8% silicon (Si), up to about 0.08% carbon (C), and a balance of cobalt (Co) and incidental impurities.

As used herein, "MM509B", also known as "Amdry™ MM509B", refers to an alloy including a composition, by weight, of about 22.5 to about 24.25% Cr, about 9.0 to about 11.0% Ni, about 6.5 to about 7.5% tungsten (W), about 3.0 to about 4.0% tantalum (Ta), about 2.0 to about 3.0% boron (B), about 0.15 to about 0.30% titanium (Ti), about 0.30 to about 0.60% zirconium (Zr), about 0.55 to about 0.65% C, and a balance of Co and incidental impurities.

As used herein, "balance of Co and incidental impurities" refers to, in addition to cobalt, small amounts of impurities and other incidental elements that are inherent in cobalt alloys, which in character and/or amount do not affect the advantageous aspects of the alloy. Unless otherwise specified, all composition percentages identified herein are in weight percent.

Figure 2:
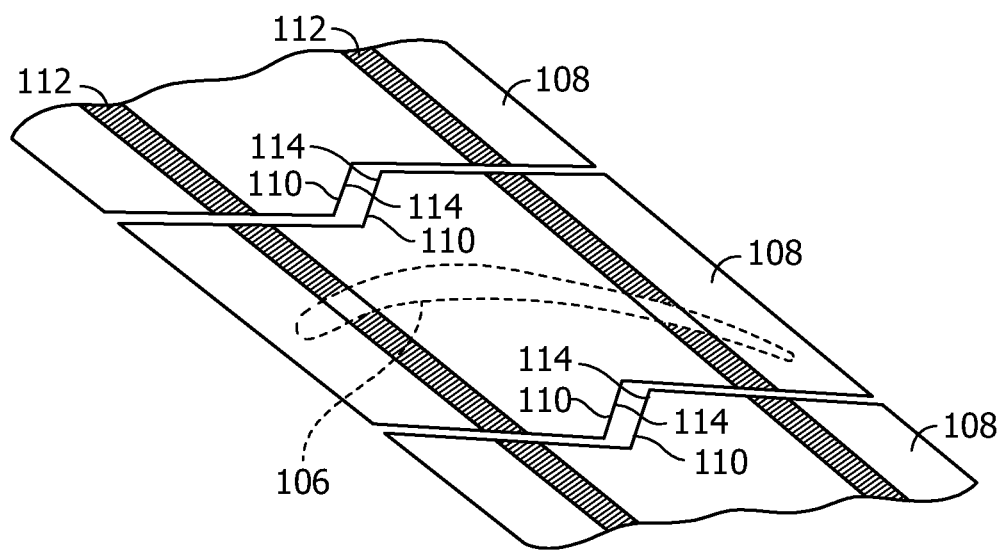
FIG. 2 is a top perspective view of region 2 of FIG. 1.

FIG. 1 is a perspective view of a turbine section 100. The turbine section 100 includes articles 108. In some embodiments, the articles 108 are turbine shrouds. The turbine section 100 also includes turbine shrouded blades 102 coupled to a hub 104. In some embodiments, the turbine shrouded blade 102 is a stage-2 shrouded blade. In some embodiments, the stage-2 shrouded blade is a stage-2 bucket. The hub 104 is coupled to a turbine shaft (not shown). The turbine shrouded blades 102 include corresponding airfoils 106 and the corresponding articles 108 are fixedly coupled to the airfoils 106. The articles 108 have two interlocking features 110 that are correspondingly opposite and are more easily seen in FIG. 2. Protrusions 112 extending from the articles 108 facilitate coupling of the turbine shrouded blades 102, thereby reducing or eliminating circumferential movement and vibration. The interlocking features 110 of the articles 108 are in the form of a z-notch on each end with mating surfaces 114.

Figure 3:
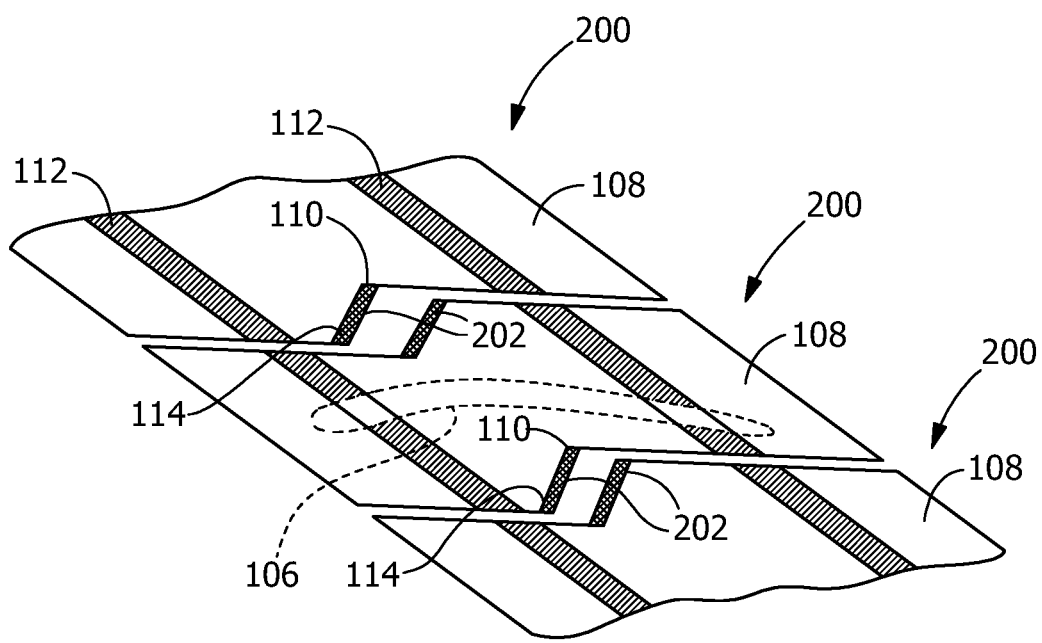
FIG. 3 is a top perspective view of a turbine component, according to an embodiment of the present disclosure.

The material of the articles 108, including the interlocking features 110, may not be of a sufficient hardness to withstand the wear stresses and rubbing that occur during start-up and shut down of a turbine. As shown in FIG. 3, a wear component 202 is brazed or welded onto one of the mating surfaces 114 to form a turbine component 200. The wear component 202 provides a wear surface and improves the wear properties at this location. In some embodiments, the wear component 202 is a hardface chiclet PSP. In some embodiments, the PSP includes, by weight, about 80% T800 and about 20% MM509B. The material bonded to the respective mating surfaces 114 protects each interlocking feature 110 within each article 108 from wear arising from frictional contact during operation, when the articles 108 are under centrifugal, pressure, thermal, and vibratory loading. In some embodiments, the wear component 202 is attached to the article 108 by brazing.

Figure 4:
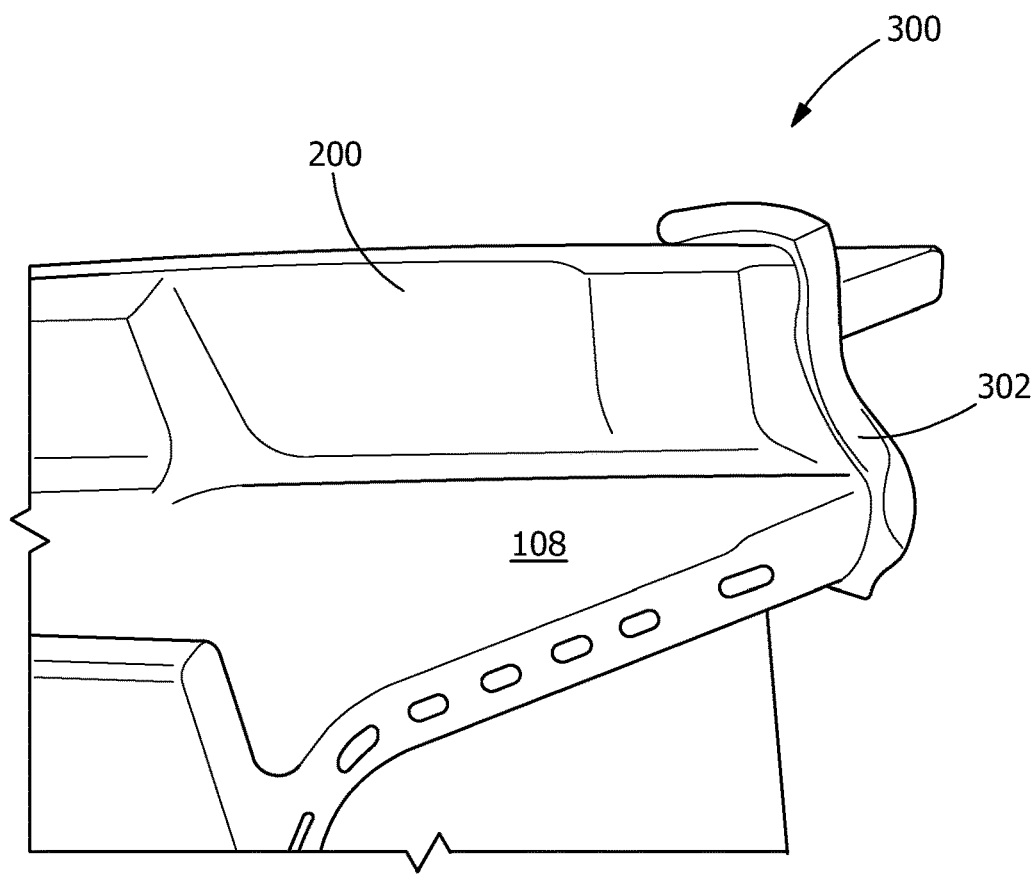
FIG. 4 is a first view of a turbine component with braze tape, according to an embodiment of the present disclosure.
Figure 5:
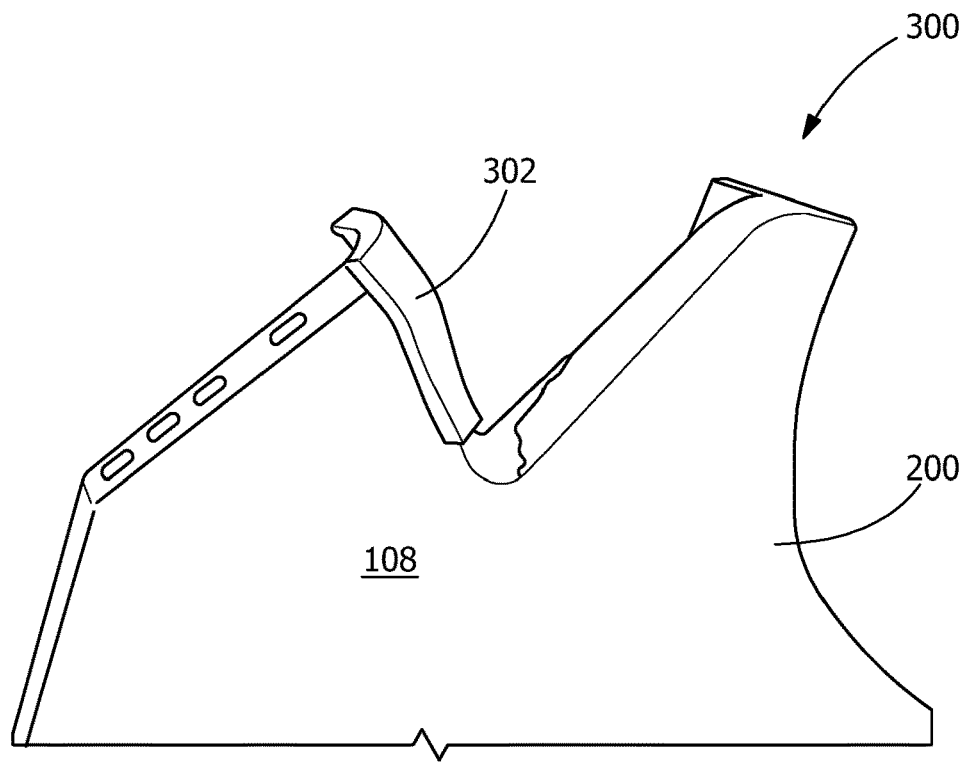
FIG. 5 is a second view of a turbine component with braze tape, according to an embodiment of the present disclosure.

FIG. 4 and FIG. 5 show an assembly 300 including a turbine component 200 and a braze tape 302 over the wear component 202 that is not visible in FIG. 4 and FIG. 5. The braze tape 302 is flexible to conform and adhere to the wear component 202 and the surface of the article 108 around the wear component 202. The assembly 300 is then subjected to thermal processing with the braze tape 302 over the wear component 202 to treat the turbine component 200. In some embodiments, the thermal processing includes thermally cycling the turbine component 200 and hot isostatic pressing the turbine component 200. In some embodiments, the thermal processing includes thermally cycling the assembly 300 and hot isostatic pressing the assembly 300. The braze tape 302 protects the wear component 202 and reduces or eliminates re-flow of the wear component 202 during the thermal cycling and during the hot isostatic pressing. The material of the braze tape 302 becomes brazed to the surface and becomes part of the wear component 202 as a result of the thermal processing.

Figure 6:
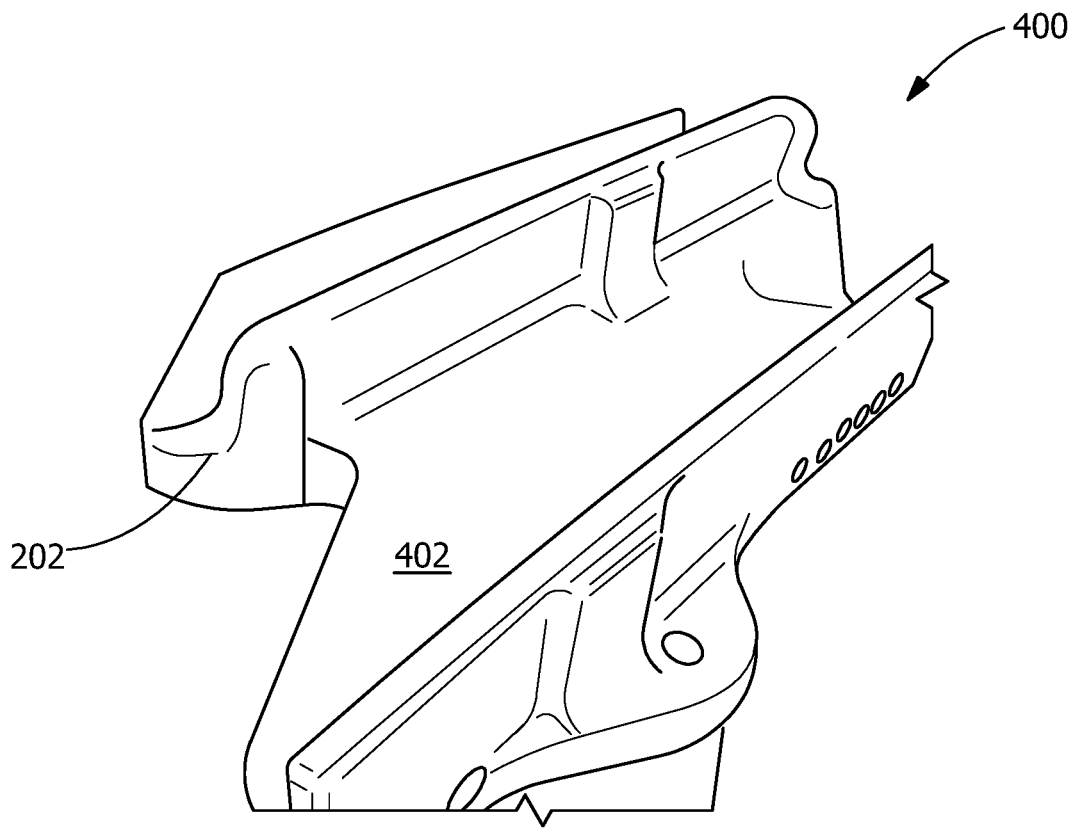
FIG. 6 is a first view of a treated turbine component after a treatment process, according to an embodiment of the present disclosure.
Figure 7:
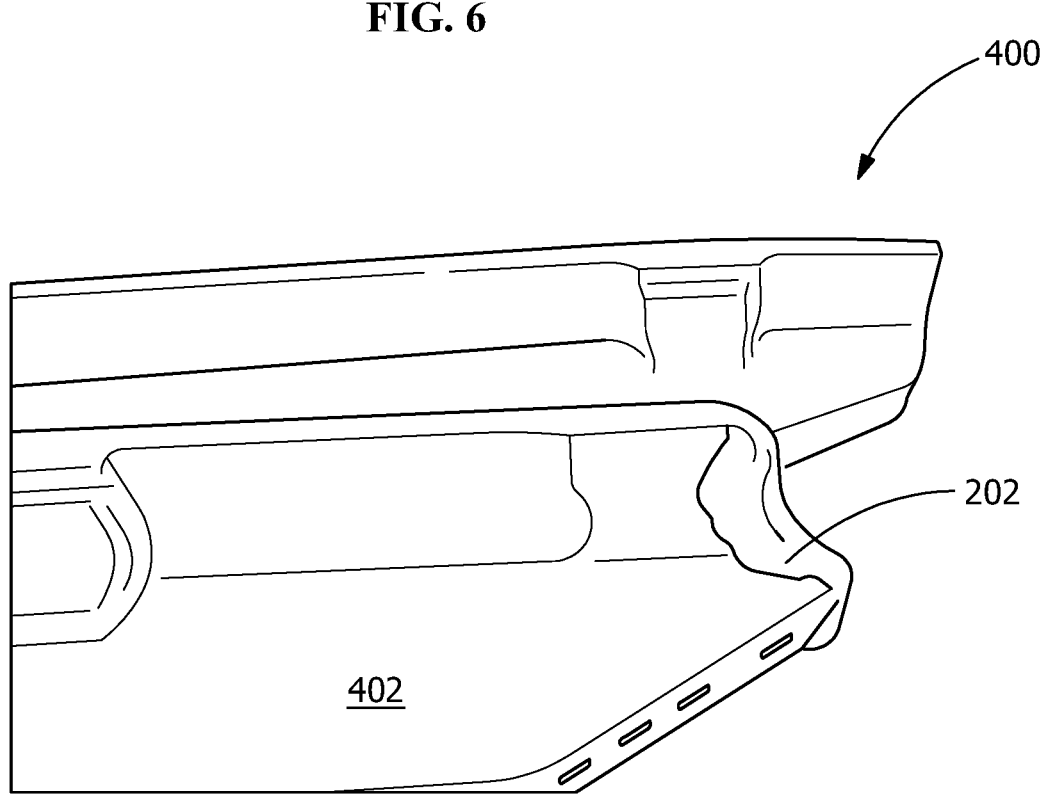
FIG. 7 is a second view of the treated turbine component of FIG. 6 after the treatment process.

FIG. 6 and FIG. 7 show a treated turbine component 400 after reconditioning, including thermal processing with LE 90/10 as the braze tape 302 covering the wear component 202. The thermal processing included thermally cycling the assembly 300 followed by hot isostatic pressing. The thermal cycling included heating the assembly 300 to about 540° C. (1000° F.) and holding at that temperature for about 30 minutes, followed by heating to about 1070° C. (1950° F.) and holding at that temperature for about 15 minutes, followed by heating to about 1230° C. (2250° F.). The hot isostatic pressing including applying a predetermined pressure at a predetermined temperature for a predetermined amount of time, followed by removal of the pressure and heat. One or more of a rejuvenation, other regular heat treatments, and a machining to final dimensions may follow the hot isostatic pressing to form the treated turbine component 400. The treated turbine component 400 includes the treated article 402 and the wear component 202. The braze tape 302 prevented re-flow of the wear component 202 on the article 108 during the thermal processing and hence provided a treated turbine component 400 with a wear component 202 without including a step of removing the wear component 202 from the article 108 prior to thermal processing and re-brazing the wear component 202 or brazing a new wear component to the treated article 402 after the thermal processing.

Figure 8:
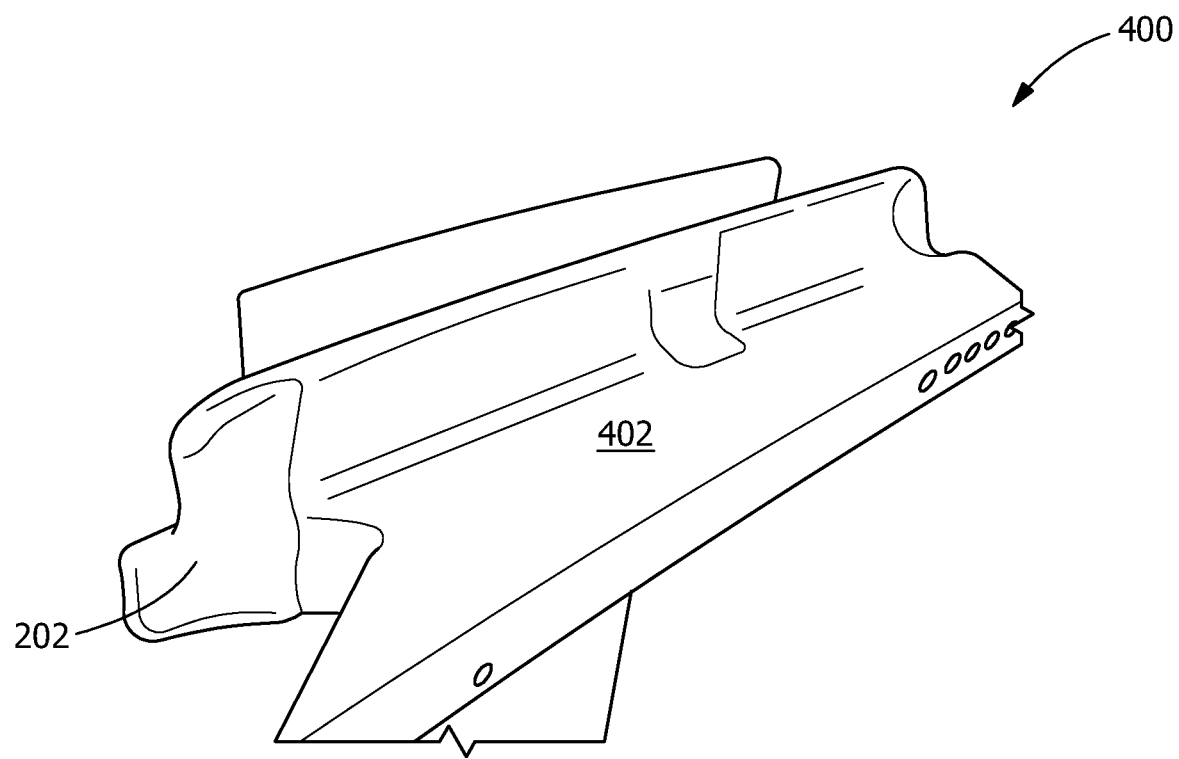
FIG. 8 is a first view of another treated turbine component after a treatment process, according to an embodiment of the present disclosure.
Figure 9:
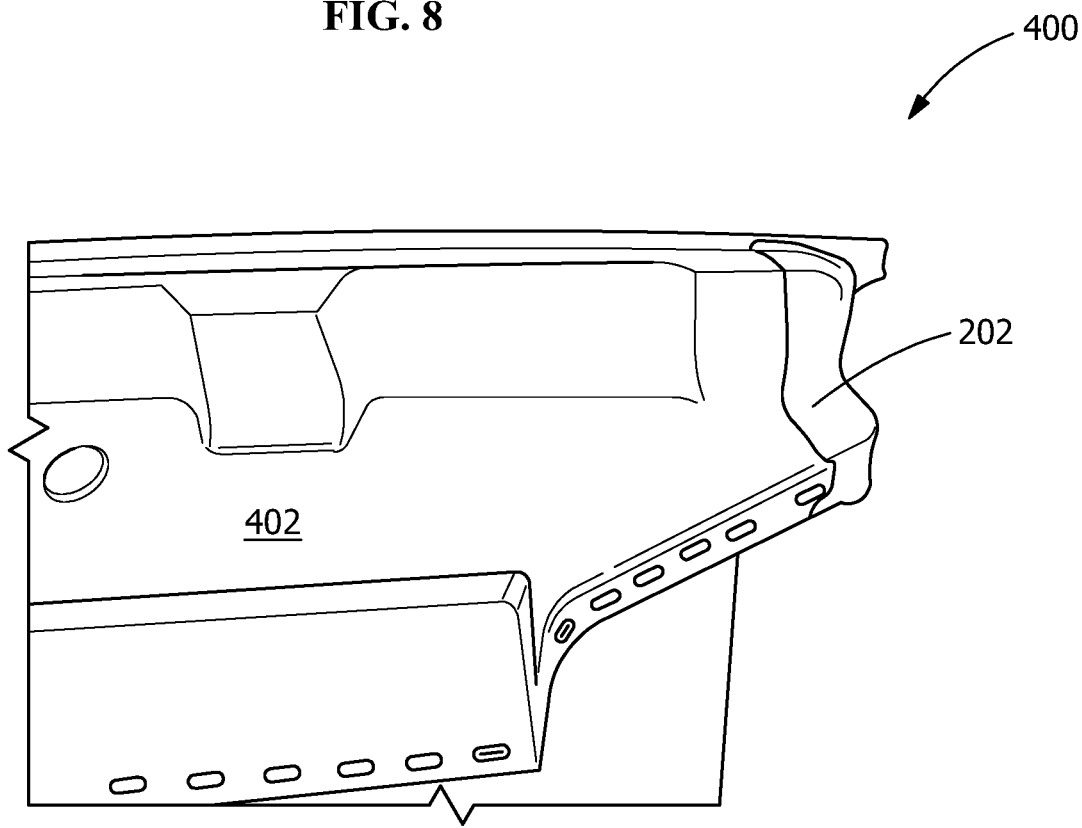
FIG. 9 is a second view of the treated turbine component of FIG. 8 after the treatment process.

FIG. 8 and FIG. 9 show a treated turbine component 400 after reconditioning, including thermal processing with TE 95/5 as the braze tape 302 covering the wear component 202. The thermal processing was the same as the thermal processing for the treated turbine component 400 of FIG. 6 and FIG. 7. The treated turbine component 400 includes the treated article 402 and the wear component 202. The braze tape 302 prevented re-flow of the wear component 202 on the article 108 during the thermal processing and hence provided a treated turbine component 400 with a wear component 202 without including a step of removing the wear component 202 from the article 108 prior to thermal processing and re-brazing the wear component 202 or brazing a new wear component to the treated article 402 after the thermal processing.

Processes described herein avoid additional steps of removal of a PSP prior to thermal processing and brazing a PSP after the thermal processing and thereby save time and cost. The process involves applying a braze tape 302 of a predetermined particular chemistry over the existing hardface chiclet PSP and subjecting the assembly 300 to a thermal cycling prior to HIP and a rejuvenation heat treatment. The braze tape 302 reduces or eliminates reflow of existing hardface chiclet PSP during the thermal processing.

In some embodiments, the reconditioning includes subjecting the turbine component to thermal cycling. In some embodiments, the thermal cycling is a braze thermal cycling. In some embodiments, the thermal cycling includes heating the turbine component to about 510 to 570° C. (about 950 to 1050° F.) for about 20 to 40 minutes. The turbine component is further heated to about 1040 to 1090° C. (about 1900 to 2000° F.) for about 10 to 20 minutes. The turbine component is then further heated to about 1150° C. to 1260° C. (about 2100° F. to 2300° F.) for about three to five hours before being removed from the heat and allowed to cool.

In some embodiments, the reconditioning includes HIP of the turbine component. In some embodiments, the HIP includes treating the component for 3-5 hours at an elevated temperature of between 1150° C. and 1260° C. (2100° F. and 2300° F.) and an elevated pressure of between 68.95 MPa and 137.9 MPa (10,000 PSI and 20,000 PSI). In some embodiments, the HIP occurs during the last stage of the thermal cycling.

In some embodiments, the reconditioning includes a rejuvenation heat treatment of the turbine component. In some embodiments, the rejuvenation heat treatment includes a thermal cycle similar to the solution heat treatment of the base material.

It will be recognized by those skilled in the art that HIP temperatures and heat treat temperatures are highly dependent on the composition and the desired properties of the component.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A process of treating a turbine component after service, the turbine component comprising an article and a wear component brazed to the article, the process comprising:
    applying a braze tape on at least a portion of the wear component, wherein the wear component is a pre-sintered preform; and
    thermal processing the turbine component while the braze tape is on the at least a portion of the wear component to treat the turbine component;
    wherein the article is a shrouded blade and the pre-sintered preform is located on a z-notch of the shrouded blade.

2. The process of claim 1, wherein the thermal processing comprises thermally cycling the turbine component and hot isostatic pressing the turbine component.

3. The process of claim 2, wherein the braze tape reduces or eliminates re-flow of the pre-sintered preform during the thermal cycling and during the hot isostatic pressing.

4. The process of claim 2, wherein the thermally cycling comprises heating the turbine component to about 510° C. to about 570° C. for about 20 minutes to about 40 minutes, followed by heating to about 1040° C. to about 1090° C. for about 10 minutes to about 20 minutes, followed by heating to about 1150° C. to about 1260° C. for about three hours to about five hours, followed by removing the turbine component from the heat and allowing the turbine component to cool.

5. The process of claim 4, wherein the braze tape reduces or eliminates re-flow of the pre-sintered preform during the thermal processing.

6. The process of claim 2, wherein the hot isostatic pressing comprises treating the turbine component at a temperature between 1150° C. and 1260° C. and a pressure between 68.95 MPa and 137.9 MPa for 3-5 hours.

7. The process of claim 1, wherein the pre-sintered preform is a hardface chiclet.

8. The process of claim 7 further comprising returning the turbine component to service without removing or replacing the hardface chiclet.

9. The process of claim 1, wherein the braze tape reduces or eliminates re-flow of the pre-sintered preform during the thermal processing.

10. The process of claim 1, wherein the article is a shroud of a stage-2 shrouded blade.

11. The process of claim 1, wherein the pre-sintered preform comprises, by weight:
    80% of a first alloy consisting essentially of a first composition, by weight, of about 16.5 to about 18.5% chromium (Cr), up to about 1.5% nickel (Ni), about 27 to about 30% molybdenum (Mo), about 3.0 to about 3.8% silicon (Si), up to about 0.08% carbon (C), and a balance of cobalt (Co) and incidental impurities, and
    20% of a second alloy consisting essentially of a second composition, by weight, of about 22.5 to about 24.25% Cr, about 9.0 to about 11.0% Ni, about 6.5 to about 7.5% tungsten (W), about 3.0 to about 4.0% tantalum (Ta), about 2.0 to about 3.0% boron (B), about 0.15 to about 0.30% titanium (Ti), about 0.30 to about 0.60% zirconium (Zr), about 0.55 to about 0.65% C, and a balance of Co and incidental impurities.

12. The process of claim 1, wherein the braze tape comprises an alloy composition of about 90% by weight of a first alloy including a first composition, by weight, of about 16.5 to about 18.5% chromium (Cr), up to about 1.5% nickel (Ni), about 27 to about 30% molybdenum (Mo), about 3.0 to about 3.8% silicon (Si), up to about 0.08% carbon (C), and a balance of cobalt (Co) and incidental impurities; and about 10% by weight of a second alloy including a second composition, by weight, of about 22.5 to about 24.25% Cr, about 9.0 to about 11.0% Ni, about 6.5 to about 7.5% tungsten (W), about 3.0 to about 4.0% tantalum (Ta), about 2.0 to about 3.0% boron (B), about 0.15 to about 0.30% titanium (Ti), about 0.30 to about 0.60% zirconium (Zr), about 0.55 to about 0.65% C, and a balance of Co and incidental impurities.

13. The process of claim 1, wherein the braze tape comprises an alloy composition of about 95% by weight of a first alloy including a first composition, by weight, of about 16.5 to about 18.5% chromium (Cr), up to about 1.5% nickel (Ni), about 27 to about 30% molybdenum (Mo), about 3.0 to about 3.8% silicon (Si), up to about 0.08% carbon (C), and a balance of cobalt (Co) and incidental impurities; and about 5% by weight of a second alloy including a second composition, by weight, of about 22.5 to about 24.25% Cr, about 9.0 to about 11.0% Ni, about 6.5 to about 7.5% tungsten (W), about 3.0 to about 4.0% tantalum (Ta), about 2.0 to about 3.0% boron (B), about 0.15 to about 0.30% titanium (Ti), about 0.30 to about 0.60% zirconium (Zr), about 0.55 to about 0.65% C, and a balance of Co and incidental impurities.

14. An assembly comprising:
    a turbine component comprising:
        an article; and
        a pre-sintered preform brazed to a surface of the article; and
    a braze tape on at least a portion of the pre-sintered preform;
    wherein the article is a shrouded blade and the pre-sintered preform is located on a z-notch of the shrouded blade.

15. The assembly of claim 14, wherein the article is a shroud of a stage-2 shrouded blade.

16. The assembly of claim 14, wherein the pre-sintered preform comprises, by weight:
    80% of a first alloy consisting essentially of a first composition, by weight, of about 16.5 to about 18.5% chromium (Cr), up to about 1.5% nickel (Ni), about 27 to about 30% molybdenum (Mo), about 3.0 to about 3.8% silicon (Si), up to about 0.08% carbon (C), and a balance of cobalt (Co) and incidental impurities, and
    20% of a second alloy consisting essentially of a second composition, by weight, of about 22.5 to about 24.25% Cr, about 9.0 to about 11.0% Ni, about 6.5 to about 7.5% tungsten (W), about 3.0 to about 4.0% tantalum (Ta), about 2.0 to about 3.0% boron (B), about 0.15 to about 0.30% titanium (Ti), about 0.30 to about 0.60% zirconium (Zr), about 0.55 to about 0.65% C, and a balance of Co and incidental impurities.

17. The assembly of claim 14, wherein the pre-sintered preform is a hardface chiclet.

18. A treated turbine component comprising:
    a treated article; and
    a pre-sintered preform brazed to a surface of the treated article;
    wherein the treated turbine component has been thermally processed with the pre-sintered preform being substantially free of re-flow; and
    wherein the treated article is a shrouded blade and the pre-sintered preform is located on a z-notch of the shrouded blade.

19. The treated turbine component of claim 18, wherein the pre-sintered preform is a hardface chiclet.

* * * * *